3,270,062
PURIFICATION OF CRUDE AQUEOUS GLYOXAL SOLUTIONS
Wolfgang Merz, Ludwigshafen (Rhine), Erich Nebe, Heidelberg, and Herbert Toussaint, Frankenthal, Pfalz, Germany, assignors to Badische Anilin- & Soda-Fabrik Aktiengesellschaft, Ludwigshafen (Rhine), Germany
No Drawing. Filed Jan. 31, 1963, Ser. No. 255,223
Claims priority, application Germany, Feb. 3, 1962, B 65,803
4 Claims. (Cl. 260—601)

This invention relates to a process for purifying crude aqueous glyoxal solutions.

It is known to purify aqueous glyoxal solutions, such as are obtained by oxidation of acetaldehyde with aqueous nitric acid, with active carbon. Although colored impurities can be substantially removed from the solutions by this treatment, it is not possible in this way to obtain solutions which are free from acid constituents. It is also found that clear solutions of glyoxal thus obtained become discolored again after some time.

The acid constituents can be removed from crude glyoxal solutions by treatment with carbonates of metals of groups IIA and IIB of the Periodic System, particularly with calcium carbonate or zinc carbonate. Solutions purified in this way, however, are not free from discoloration but are often even more strongly discolored than the crude glyoxal solutions.

It is the object of the invention to provide a process for purifying crude aqueous glyoxal solutions.

The object of the invention is achieved by contacting glyoxal solutions with an anion exchanger resin containing tertiary amino groups or quaternary ammonium groups in the bicarbonate salt form.

It is possible for example to purify according to this invention aqueous solutions of crude glyoxal such as are obtained in the production of glyoxal. It is particularly advantageous to purify by the process glyoxal solutions such as are obtained by oxidation of acetaldehyde with aqueous nitric acid or by catalytic dehydrogenation of ethylene glycol.

The concentration of glyoxal in the solutions to be purified may vary within wide limits. It is however advisable not to use highly concentrated solutions because in such solutions the exchange between the acid constituents and the anion of the exchanger resin proceeds slowly. It is usually advantageous to use solutions which contain between 10 and 50% by weight of glyoxal. Obviously solutions having a lower or higher content of glyoxal may also be purified by the process according to this invention.

It is necessary to use anion exchanger resins which contain tertiary amino groups or quaternary ammonium groups, because primary or secondary amino groups react with the carbonyl groups of glyoxal so that exchanger resins containing such groups gradually lose their usefulness. Ion exchanger resins which contain quaternary ammonium groups are preferred. It is not advantageous to use the anion exchanger resins in the hydroxyl form. It has been found that such basic exchanger resins cause a reaction of the glyoxal of the type of the Cannizzaro reaction or resinification. When exchanger resins having anions other than the bicarbonate anion are used, these anions pass into the solution by exchange with the acid constituents of the solution to be purified, so that the acids corresponding to the anion of the exchanger resin used are then present in the solution. Carbon dioxide set free by exchange of the bicarbonate anion mainly escapes in gaseous form; dissolved carbon dioxide can be easily removed from the purified solution by heating for a short time.

Commercially available anion exchanger resins having tertiary amino groups or quatenary ammonium groups, such as are set out for example in Ullmann's Encyklopädie der technischen Chemie, volume 8, published by Urban & Schwarzenberg, Munich-Berlin (1957), page 817, are suitable for the process according to this invention. These anion exchanger resins, which are usually in the chloride or sulfate form, are first converted into the hydroxyl form in the conventional way by treatment with alkali hydroxide solutions. The exchanger is then washed with an aqueous solution of carbon dioxide or treated with water and carbon dioxide gas.

The solutions of glyoxal may be contacted with the anion exchanger resins in various ways. For example it is possible to pass the solutions through columns of the exchanger. The crude solutions may also be treated with the exchangers in mixing vessels.

The process according to this invention is carried out at a temperature between the setting point of the solution and the maximum permissible working temperature for the exchanger being used, but below the temperature at which glyoxal decomposes in the presence of the impurities present in the solutions. It is advantageous to purify the solutions at temperatures between 10 and 30° C.

Clear colorless solutions which are free from acid constituents are obtained by purification according to this invention of crude solutions of glyoxal such as are obtained for example in the production of glyoxal. It is found particularly that no discoloration occurs in solutions thus obtained even after prolonged storage.

The invention is illustrated by the following example.

EXAMPLE (a) A bed 100 cm. in height and 4 cm. in diameter contains 1250 cc. of the exchanger "Permutit ES" (trademark) manufactured by Permutit AG, Berlin-Schmargendorf, which contains quaternary ammonium groups in the chloride form. The exchanger is first converted to the hydroxyl form by contacting it with 6% caustic soda solution. Excess of caustic soda solution is then washed out with water and carbon dioxide is led through the bed of exchanger until the exchanger will not absorb any more carbon dioxide.

3000 g. of 42%, strongly yellow colored aqueous glyoxal solution which has been obtained by oxidation of acetaldehyde with aqueous nitric acid is passed over the exchanger thus treated. The solution contains 6% of acid, particularly glyoxylic acid and glycolic acid.

(b) The same amount of the glyoxal solution specified under (a) is passed over a column containing 1250 cc. of finely divided active carbon.

(c) 2600 g. of the glyoxal solution specified under (a) is diluted with 1000 g. of water and then 200 g. of finely divided calcium carbonate is added. The suspension obtained is stirred at 40° C. until neutralization has taken place. The suspension is then filtered, the calcium carbonate filtered off is washed with water and the clear solution obtained is concentrated to a glyoxal content of 42%. The color number according to Hazen (ASTM D268), the acid content and the content of inorganic constituents are determined on the purified glyoxal solutions obtained under (a), (b) and (c). The results are given in the following table:

Table

|  | Glyoxal solution purified as in— | | |
|---|---|---|---|
|  | (a) | (b) | (c) |
| Acid number of the crude glyoxal solution | 64 | 73 | 52 |
| Color number of the crude glyoxal solution | 41 | 37 | 28 |
| Acid number after purification | <1 | 72 | <1 |
| Color number immediately after purification | 6 | 6 | 61 |
| Color number after two months | 5 | 24 | 113 |
| Content of inorganic constituents (percent by weight of ash) | 0 | 0 | 1.1 |

As the results show, a clear colorless solution of glyoxal which does not subsequently darken even after prolonged storage is obtained by the process according to the present invention. This solution is moreover distinguished by the fact that it is practically free from acid and inorganic constituents.

Instead of "Permutit ES" which contains quaternary ammonium ions it is possible to use in the said process, "Permutit ESB" which contains tertiary amino groups and is obtainable from the same source.

We claim:

1. A process for the purification of crude, colored, aqueous solutions of glyoxal produced by the oxidation of acetaldehyde with aqueous nitric acid which comprises contacting said solutions with an anion exchanger resin the ion exchanging groups of which are selected from at least one member of the class consisting of tertiary amino group and quaternary ammonium groups, said groups being in the bicarbonate salt form at a temperature between the setting point of said solution and the maximum working temperature of said resin and below the decomposition temperature of said solution for a period of time sufficient to decolorize said solution.

2. A process for the purification of crude, colored, aqueous solutions of glyoxal produced by the oxidation of acetaldehyde with aqueous nitric acid which comprises contacting the glyoxal solution with an anion exchanger resin containing quaternary ammonium groups in bicarbonate salt form at a temperature between the setting point of said solution and the maximum working temperature of said resin and below the decomposition temperature of said solution for a period of time sufficient to decolorize said solution.

3. A process as claimed in claim 1 in which the glyoxal solution contains between 10 and 50% by weight of glyoxal.

4. A process as claimed in claim 1, in which the temperature is maintained between 10 and 30° C.

References Cited by the Examiner
UNITED STATES PATENTS
3,079,985    3/1963    Boehme et al. _____ 260—601

FOREIGN PATENTS
573,051    11/1945    Great Britain.

OTHER REFERENCES
Calmon et al.: Ion Exchangers in Org. Chem. and Biochem., pp. 126–127.

Rohm and Haas: Lab. Manual, Amberlite IR–4B, p. 1, February 1947; IRA–410, p. 1, May, 1950.

Walker: Formaldehyde, 2nd ed., 1953, pp. 28–30.

LEON ZITVER, *Primary Examiner.*

J. J. SETELIK, B. HELFIN, *Assistant Examiners.*